United States Patent
Ueki

(10) Patent No.: US 11,545,732 B2
(45) Date of Patent: Jan. 3, 2023

(54) WIRELESS COMMUNICATION DEVICE

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 80 days.

(21) Appl. No.: 17/108,097

(22) Filed: Dec. 1, 2020

(65) Prior Publication Data
US 2021/0083361 A1  Mar. 18, 2021

Related U.S. Application Data

(63) Continuation of application No. PCT/JP2019/012079, filed on Mar. 22, 2019.

(30) Foreign Application Priority Data

Jul. 13, 2018 (JP) .............................. JP2018-133177

(51) Int. Cl.
*H01Q 1/22* (2006.01)
*G06K 19/077* (2006.01)
*H01Q 1/38* (2006.01)

(52) U.S. Cl.
CPC ....... *H01Q 1/2225* (2013.01); *G06K 19/0775* (2013.01); *G06K 19/07775* (2013.01); *H01Q 1/38* (2013.01)

(58) Field of Classification Search
CPC ........ H01Q 1/2225; H01Q 1/38; H01Q 9/285; H01Q 9/26; G06K 19/0775; G06K 19/07775; G06K 19/07786
See application file for complete search history.

(56) References Cited

U.S. PATENT DOCUMENTS

| | | | | |
|---|---|---|---|---|
| 6,892,545 B2* | 5/2005 | Ishikawa | .................. | B65D 5/42 62/126 |
| 7,535,366 B2* | 5/2009 | Egbert | ................. | H04B 5/0062 340/572.7 |
| 7,919,736 B2* | 4/2011 | Ikeda | ................... | H05B 6/6426 219/713 |

(Continued)

FOREIGN PATENT DOCUMENTS

| | | |
|---|---|---|
| JP | 2006197491 A | 7/2006 |
| JP | 2007164528 A | 6/2007 |

(Continued)

OTHER PUBLICATIONS

Hofmann, L.; "UHF RFID Industry Heat Resistant Tag"; Proceedings of the 12th International conference Reliability and Statistics in Transportation and Communication, Oct. 2012, pp. 326-331.

(Continued)

*Primary Examiner* — Seung H Lee
(74) *Attorney, Agent, or Firm* — ArentFox Schiff LLP

(57) ABSTRACT

An RFID tag is provided as a wireless communication device for transmitting and receiving a communication signal. The RFID tag includes a base material, antenna patterns formed on the base material, an RFIC package that is a feeder circuit connected to the antenna patterns, and an LC resonance circuit that is adjacent to the antenna patterns and resonates at a frequency higher than the frequency of the communication signal.

20 Claims, 11 Drawing Sheets

(56) References Cited

U.S. PATENT DOCUMENTS

| | | | |
|---|---|---|---|
| 2007/0132593 A1 | 6/2007 | Yamazaki | |
| 2016/0034732 A1* | 2/2016 | Cho | H04B 1/10 340/10.1 |
| 2018/0048065 A1 | 2/2018 | Zimmerman et al. | |
| 2018/0062271 A1 | 3/2018 | Toyao | |
| 2018/0189623 A1* | 7/2018 | Forster | G06K 19/07798 |
| 2019/0386376 A1* | 12/2019 | Kato | H01Q 5/335 |

FOREIGN PATENT DOCUMENTS

| | | |
|---|---|---|
| JP | 2006338563 A | 12/2016 |
| WO | 2015045614 A1 | 4/2015 |
| WO | 2016148274 A1 | 9/2016 |

OTHER PUBLICATIONS

International Search Report Issued for PCT/JP2019/012079, dated Apr. 23, 2019.
Written Opinion of the International Searching Authority issued for PCT/JP2019/012079, dated Apr. 23, 2019.

* cited by examiner

λ/4 RESONANCE
fo

λ/2 RESONANCE
2fo

3λ/4 RESONANCE
3fo

λ RESONANCE
4fo

PRIOR ART

WIRELESS COMMUNICATION DEVICE

CROSS REFERENCE TO RELATED APPLICATIONS

The present application is a continuation of PCT/JP2019/012079 filed Mar. 22, 2019, which claims priority to Japanese Patent Application No. 2018-133177, filed Jul. 13, 2018, the entire contents of each of which are incorporated herein by reference.

TECHNICAL FIELD

The present invention relates to a wireless communication device provided with an antenna, and, in particular, to a wireless communication device, such as an RFID (Radio Frequency Identification) tag, that performs short-range communication via an induced electromagnetic field or an electromagnetic wave.

BACKGROUND

In general, an RFID tag, which is a type of wireless communication device, is used in various situations because it communicates with a reader/writer to read and write predetermined information in a non-contact manner. For example, by attaching the RFID tags to all products, so-called self-checkout can be performed smoothly in a store, for example. In addition, sales and distribution status management such as ensuring traceability and marketing can be carried out smoothly.

On the other hand, a wide variety of products are handled at stores such as convenience stores and supermarkets, and some of the groceries as products are warmed immediately after the purchase of the product to be taken home or to be eaten or drunk immediately on the spot by the purchaser. For example, lunch boxes and prepared dishes may be heated at a store using an electromagnetic wave heating device, such as a microwave oven.

However, when a product with an RFID tag is heated in a microwave oven, the following problems may occur.

As the frequency of the communication signal of the RFID tag, the LF band of 135 kHz or less, the HF band of 13.56 MHz or the like, the UHF band of 860 MHz to 960 MHz, and the microwave band of 2.45 GHz or the like are mainly used. Currently, the RFID tag of a type attached to food is an RFID tag that uses the UHF band. In the RFID tag that uses the UHF band, a metal material such as an antenna pattern, which is a metal film body, is formed on a base material such as paper or resin together with an RFIC (Radio-Frequency Integrated Circuit) element.

When a product with such an RFID tag is heated in a microwave oven, the energy of electromagnetic waves from the microwave oven is absorbed by the RFID tag together with the product. This causes a risk of ignition at the RFID tag or the product part to which the RFID tag is attached, due to one or more of the following reasons.

First a discharge may occur at a place where the electric field strength is high in the above metal material part. Second, heat generation and sublimation of metal material may occur due to overcurrent flowing through the metal material part. Third, heat generation may occur of RFID tag base material.

In particular, the microwave oven installed in a convenience store emits a high-power electromagnetic wave of about 3 kW into its chamber, and the RFID tag is heated at once immediately after the start of heating, so that when the conditions are met, it can understood that the above-mentioned risk of ignition is high.

Currently, a configuration of a "flame-retardant" tag has been proposed for the purpose of reducing the risk of ignition in the RFID tag as described above (Japanese Patent Unexamined Publication No. 2006-338563; hereinafter "Patent Literature 1").

The flame-retardant tag disclosed in Patent Literature 1 has a base material formed of a flame-retardant material on which an IC chip and an antenna pattern are mounted. Therefore, the combustion of the base material is suppressed. However, the metal material portion formed on the base material has a high possibility of temporally continuous discharge, and the tag does not have a configuration capable of reliably preventing the risk of ignition of the base material and the possibility of ignition of the product.

SUMMARY OF THE INVENTION

Accordingly, it is an object of the present invention to provide a wireless communication device constructed to prevent ignition or combustion even when the device is attached to food or the like and receives high frequency electric power for heating food.

In an exemplary aspect, a wireless communication device is provided for transmitting and receiving a communication signal, and includes a base material, an antenna pattern formed on the base material, a feeder circuit connected to the antenna pattern, and an LC resonance circuit that is adjacent to the antenna pattern and resonates at a frequency higher than a frequency of the communication signal.

According to the above structure and configuration, since the LC resonance circuit is adjacent to the antenna pattern, at a frequency higher than the frequency of the communication signal, for example, a frequency of a microwave for electromagnetic wave heating, the antenna pattern does not resonate, and the current is less likely to be induced. That is, the antenna pattern is less likely to receive the energy of the microwave for electromagnetic wave heating. Further, the LC resonance circuit resonates at the frequency of the microwave for electromagnetic wave heating, so that the LC resonance circuit itself and the antenna pattern or the base material adjacent thereto are heated. The antenna pattern or the base material is heated to be melted and cut or to be cut by sublimation. That is, the antenna pattern is separated at a portion (hereinafter referred to as "LC resonance circuit adjacent portion") which the LC resonance circuit is adjacent to. When the antenna pattern is separated at the LC resonance circuit adjacent portion, the resonance (the harmonic resonance) no longer occurs at the antenna pattern with the above-mentioned microwave for electromagnetic wave heating. As such, the heat generation of the antenna pattern is not maintained and the temperature rise due to the harmonic resonance is stopped. Therefore, the wireless communication device or the product portion to which the wireless communication device is attached is prevented from melting or deforming.

According to the exemplary embodiment of the present invention, a wireless communication device is provided that is configured to prevent ignition and combustion even when it is attached to food or the like and receives high frequency electric power for heating food.

DETAILED DESCRIPTION OF EMBODIMENTS

Figure 1A:
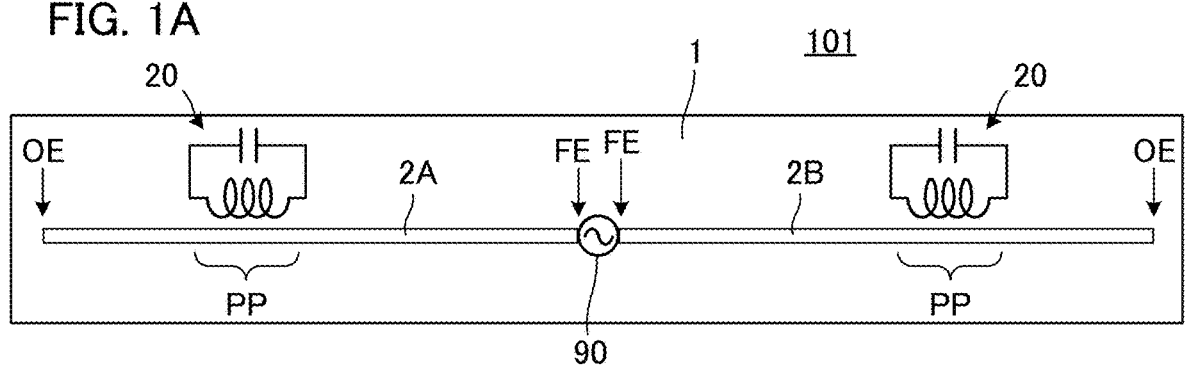
FIG. 1A is a plan view of an RFID tag 101 according to a first exemplary embodiment.

First, the configurations of various aspects of the wireless communication device according to exemplary aspects of the present invention will be described.

The wireless communication device of a first exemplary aspect is a wireless communication device for transmitting and receiving a communication signal. In this aspect, the wireless communication device includes a base material; an antenna pattern formed on the base material; a feeder circuit connected to the antenna pattern; and an LC resonance circuit that is adjacent to the antenna pattern and that resonates at a frequency higher than a frequency of the communication signal.

According to the above structure and configuration, since the LC resonance circuit is adjacent to the antenna pattern, at a frequency higher than the frequency of the communication signal (e.g., a frequency of a microwave for electromagnetic wave heating), the antenna pattern does not resonate, and the current is less likely to be induced. That is, the antenna pattern is less likely to receive the energy of the microwave for electromagnetic wave heating. Further, the LC resonance circuit resonates at the frequency of the microwave for electromagnetic wave heating, so that the LC resonance circuit itself and the antenna pattern or the base material adjacent thereto are heated. The antenna pattern or the base material is heated to be melted and cut or to be cut by sublimation. That is, the antenna pattern is separated at the LC resonance circuit adjacent portion. When the antenna pattern is separated at the LC resonance circuit adjacent portion, the resonance (harmonic resonance) no longer occurs at the antenna pattern with the above-mentioned microwave for electromagnetic wave heating, so that the heat generation of the antenna pattern is not maintained and the temperature rise due to the harmonic resonance is stopped. Therefore, the wireless communication device or the product portion to which the wireless communication device is attached is prevented from melting or deforming.

In the wireless communication device of a second exemplary aspect, the antenna pattern is a pattern defining a dipole-type electric field antenna whose feeding end is connected to the feeder circuit and whose tip is an open end, and the LC resonance circuit is disposed adjacent to an intermediate portion from the feeding end to the open end.

In the wireless communication device of a third exemplary aspect, harmonic resonance occurs at the antenna pattern at a frequency higher than a resonance frequency at the frequency of the communication signal, and the LC resonance circuit is disposed adjacent to a portion (e.g., the maximum point of the harmonic current) of the antenna pattern where a harmonic current due to the harmonic resonance is concentrated.

In the wireless communication device of a fourth exemplary aspect, the resonance at the frequency of the communication signal is ¼ wavelength resonance, and the harmonic resonance is ½ wavelength resonance or ¾ wavelength resonance.

In the wireless communication device of a fifth exemplary aspect, the antenna pattern has a meander line shape, and the LC resonance circuit is disposed between conductor patterns facing each other of the antenna pattern.

In the wireless communication device of the sixth exemplary aspect, the frequency of the communication signal is a frequency in a UHF band, and the frequency of the harmonic resonance is a frequency of 2.4 GHz or more and 2.5 GHz or less.

In general, convenience stores and supermarkets that sell products with wireless communication devices handle a wide variety of products such as food and daily necessities. In recent years, various experiments have been conducted on convenience stores toward the practical application of "unmanned" convenience stores that automate accounting and bagging of purchased products.

In order to automate product accounting in "unmanned" convenience stores, RFID tags can be attached to all products. In the "unmanned" convenience store, when a shopping basket containing products with RFID tags is placed on the checkout table, the information from the RFID tags is read and the product price is displayed. The purchaser can either put cash as the product price into the cash slot or insert a credit card to complete the payment and receive the product automatically packed in the shopping bag to complete the purchase of the product at the "unmanned" convenience store.

Hereinafter, exemplary embodiments as specific examples of the wireless communication device according to the present invention will be described with reference to the accompanying drawings. The products to which the wireless communication devices according to the present invention are attached include all products handled at retail stores, such as convenience stores and supermarkets.

The electromagnetic wave heating device described in the following embodiment can be described as a microwave oven that performs dielectric heating, but the electromagnetic wave heating device in the exemplary embodiments can be any heating device having a function of performing dielectric heating. Further, in the following embodiment, the RFID tag attached to the above product will be described as an example of the wireless communication device.

Hereinafter, a plurality of exemplary embodiments of the present invention will be sequentially shown. The same reference numerals are given to the same parts in the drawings referred to in each embodiment. In consideration of ease of explanation or understanding of the main points, the embodiments are shown separately for convenience, but partial replacement or combination of configurations shown in different embodiments is possible. In the second and subsequent embodiments, descriptions of matters common to the first embodiment are omitted, and only different points will be described. In particular, the same operational effect by the same configuration will not be successively described for each embodiment.

First Exemplary Embodiment

Figure 1B:
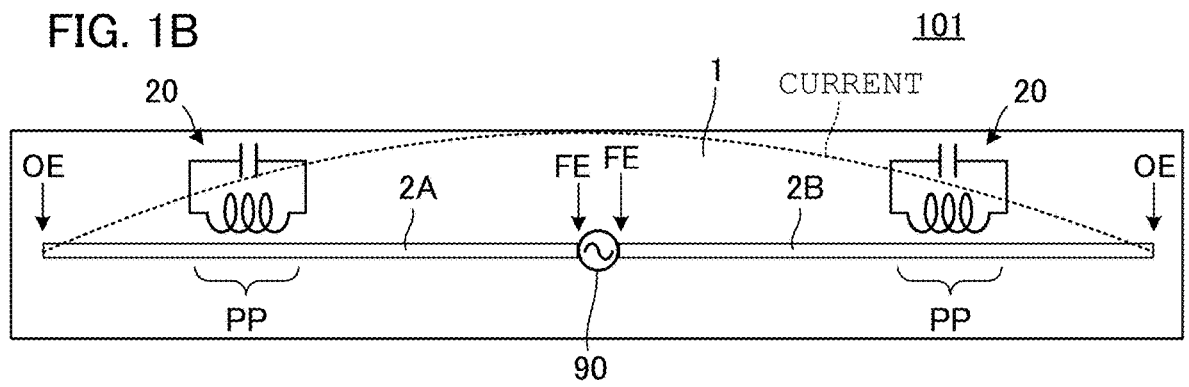
FIGS. 1B and 1C are diagrams showing intensity distributions of currents flowing through an antenna pattern of the RFID tag 101.
Figure 1C:
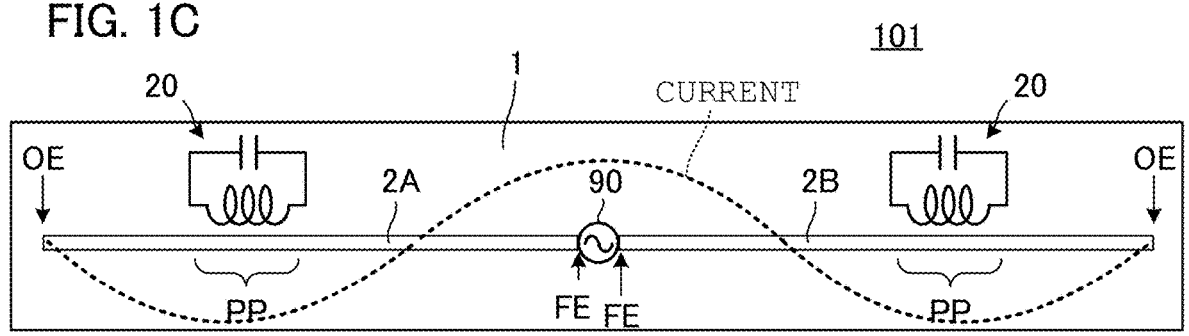
Figure 1D:
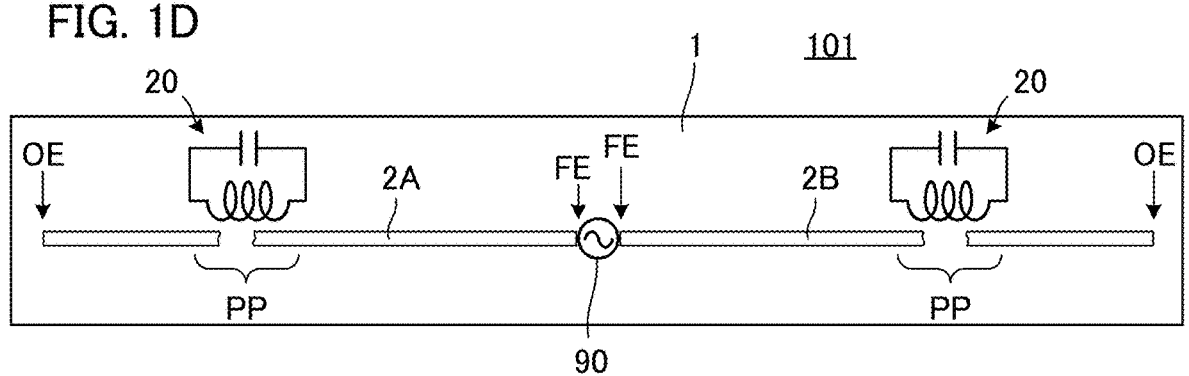
FIG. 1D is a plan view of an RFID tag showing a state of the antenna pattern after fusing by melting or cutting by sublimation.

FIG. 1A is a plan view of an RFID tag 101 according to the first embodiment, and FIGS. 1B and 1C are diagrams showing the intensity distributions of currents flowing through the antenna pattern of the RFID tag 101. Further, FIG. 1D is a plan view of the RFID tag 101 showing a state of the antenna pattern after cutting by melting or by sublimation.

As shown in FIG. 1A, the RFID tag 101 includes an insulating or dielectric base material 1, antenna patterns 2A and 2B formed on the base material 1, and a feeder circuit 90 that feeds power to the antenna patterns 2A and 2B.

The RFID tag 101 of the present embodiment is configured to perform wireless communication (i.e., transmission and/or reception) with a high frequency signal including the frequency (i.e., the carrier frequency) of the communication signal in the UHF band. The UHF band is a frequency band from 860 MHz to 960 MHz. Here, the frequency of the communication signal in the UHF band is an example of the frequency of the communication signal in the present disclosure.

The feeder circuit 90 is, for example, an RFIC element, an RFIC package, or the like, which will be exemplified later. In the RFID tag 101 of the present embodiment, a flexible film material or a flame-retardant film material is used as the base material 1. The outer shape of the base material 1 in a plan view is rectangular in the exemplary aspect. When the base material 1 is a normal film material that is not flame-retardant, the thickness of the base material 1 may be as thin as 38 μm or less. As a result, before burning, the base material 1 melts and deforms, allowing the shape of the base material not to be maintained.

When a flame-retardant film is used for the base material 1, as the flame-retardant film material used, for example, a film obtained by adding a halogen-based flame-retardant material or coating a flame-retardant coating material to a resin material such as PET (polyethylene terephthalate) resin or PPS (polyphenylene sulfide) resin is used. Further, as the material of the base material 1, it is also possible to use a resin material having high functions in terms of heat resistance, hydrolysis resistance, and chemical resistance, such as PEN (polyethylene naphthalate) resin having heat resistance. The base material 1 does not necessarily need a flame-retardant material, and may be made of, for example, a paper material in an alternative aspect.

The antenna patterns 2A and 2B formed by a film of a conductive material such as an aluminum foil or a copper foil are formed on the surface of the base material 1. Further, the feeder circuit 90 is electrically connected to the antenna patterns 2A and 2B formed on the surface of the base material 1.

As shown in FIG. 1A, the antenna patterns 2A and 2B are extended from the feeder circuit 90 in opposite directions, respectively. The antenna pattern 2A, 2B is a pattern defining a dipole-type electric field antenna whose feeding end FE is connected to the feeder circuit 90 and whose tip is an open end OE.

The waveform of a current distribution shown in FIG. 1B shows a current distribution in fundamental wave resonance in which a standing wave having a ¼ wavelength is generated in each of the first antenna pattern 2A and the second antenna pattern 2B. Fundamental wave resonance occurs at the RFID tag 101 in this way at the frequency of the communication signal. As described above, the antenna patterns 2A and 2B of the RFID tag 101 of the present embodiment act as a dipole type electric field antenna during communication as the RFID tag.

The waveform of a current distribution shown in FIG. 1C shows a current distribution in harmonic resonance in which a standing wave having a ¾ wavelength is generated in each of the first antenna pattern 2A and the second antenna pattern 2B. Harmonic resonance occurs at the RFID tag 101 in this way at a frequency of a microwave for electromagnetic wave heating.

The RFID tag 101 includes an LC resonance circuit 20 that is adjacent to an adjacent position PP of the antenna patterns 2A and 2B. The LC resonance circuit 20 resonates at a frequency of the microwave for electromagnetic wave heating, which is a frequency higher than the frequency of the communication signal. As described above, in this example, the frequency of the communication signal is in the frequency band of 860 MHz to 960 MHz, and the frequency of the microwave for electromagnetic wave heating is, for example, a frequency of 2.4 GHz or more and 2.5 GHz or less.

As shown in FIG. 1C, since the LC resonance circuit is adjacent to the antenna patterns 2A and 2B, harmonic resonance does not occur at the antenna patterns 2A and 2B at the frequency of the microwave for electromagnetic wave heating, and the current is less likely to be induced. That is, the antenna patterns 2A and 2B are less likely to receive the energy of the microwave for electromagnetic wave heating. Further, when the LC resonance circuit 20 resonates at the frequency of the microwave for electromagnetic wave heating, the LC resonance circuit 20 itself and the antenna patterns 2A and 2B or the base material 1 adjacent thereto are heated. The antenna patterns 2A and 2B or the base material 1 are cut by melting or by sublimation at the adjacent position PP by the heating. FIG. 1D shows a state after the antenna patterns 2A and 2B are separated at the adjacent position PP in this way.

In the present embodiment, as shown in FIG. 1C, the adjacent position PP is also a harmonic current concentration portion where the current density increases at the frequency of the harmonic resonance. The current density of this adjacent position PP is higher than that of other positions. Therefore, the degree of coupling between the LC resonance circuit 20 and the antenna patterns 2A and 2B is increased, and the resonance frequency of the antenna patterns 2A and 2B shifts more effectively. As a result, harmonic resonance does not occur at the antenna patterns 2A and 2B at the frequency of the microwave for electromagnetic wave heating.

As shown in FIG. 1D, when the antenna patterns 2A and 2B are separated at the adjacent position PP, the effective length of the antenna patterns 2A and 2B becomes short, so that the antenna patterns 2A and 2B do not act as an antenna pattern (i.e., a radiating element). In this state, the harmonic resonance shown in FIG. 1C cannot be maintained, and even when the irradiation of the microwave for electromagnetic wave heating continues, the above harmonic current does not flow in the antenna patterns 2A and 2B, and the temperature rise stops and ignition does not occur.

In the example shown above, at the antenna patterns 2A and 2B, fundamental wave resonance occurs at the frequency of the communication signal at ¼ wavelength, and harmonic resonance (i.e., the third harmonic resonance) occurs at the frequency for electromagnetic wave heating at ¾ wavelength. However, as illustrated below, there are other combinations of the resonance mode at the frequency of the communication signal and the resonance mode at the frequency for electromagnetic wave heating.

FIGS. 2A to 2D are diagrams showing examples of a resonance mode at the frequency of the communication signal or a resonance mode at the frequency of the microwave for electromagnetic wave heating by the current distribution and voltage distribution. In a resonance mode shown in FIG. 2A, which is the resonance mode already shown in FIG. 1B, fundamental wave resonance occurs at a resonance frequency fo at ¼ wavelength from the feeding end to the open end. In a resonance mode shown in FIG. 2B, harmonic resonance occurs at a resonance frequency 2 fo at ½ wavelength from the feeding end to the open end. In a resonance mode shown in FIG. 2C, which is the resonance mode already shown in FIG. 1C, harmonic resonance occurs at a resonance frequency 3 fo at a ¾ wavelength from the feeding end to the open end. In a resonance mode shown in FIG. 2D, harmonic resonance occurs at a resonance frequency 4 fo at one wavelength from the feeding end to the open end.

Figure 2A:
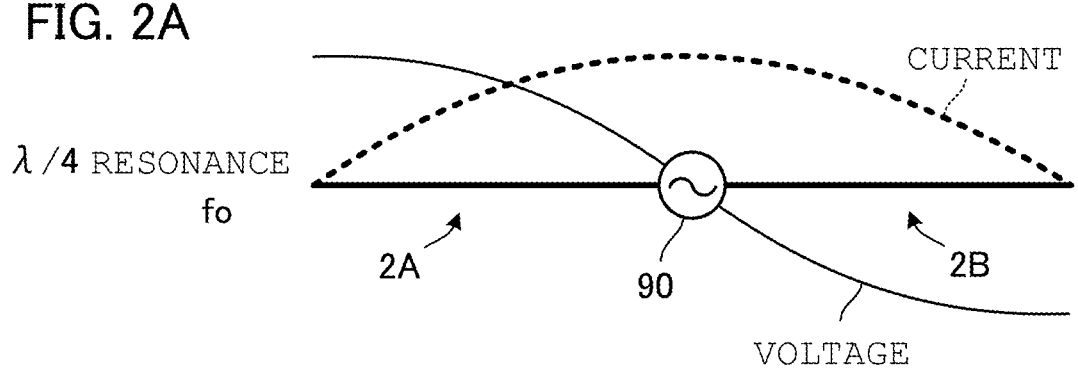
FIG. 2A, FIG. 2B, FIG. 2C, and FIG. 2D are diagrams showing an example of a resonance mode at the frequency of the communication signal or a resonance mode at the frequency of the microwave for electromagnetic wave heating.
Figure 2B:
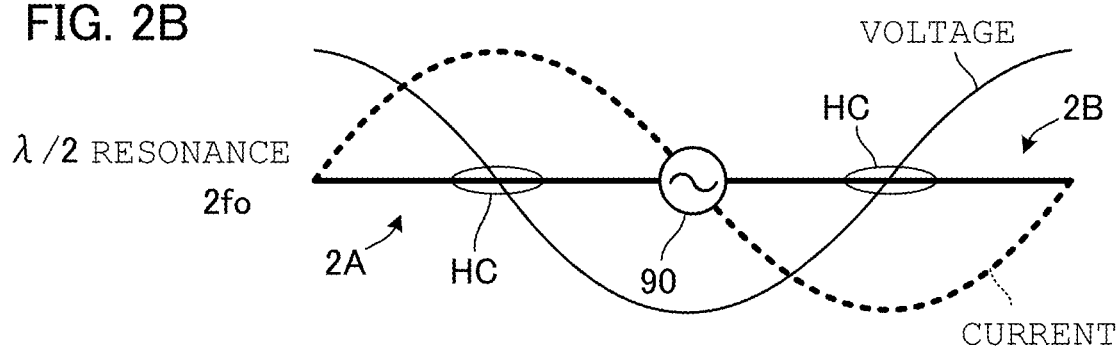
Figure 2C:
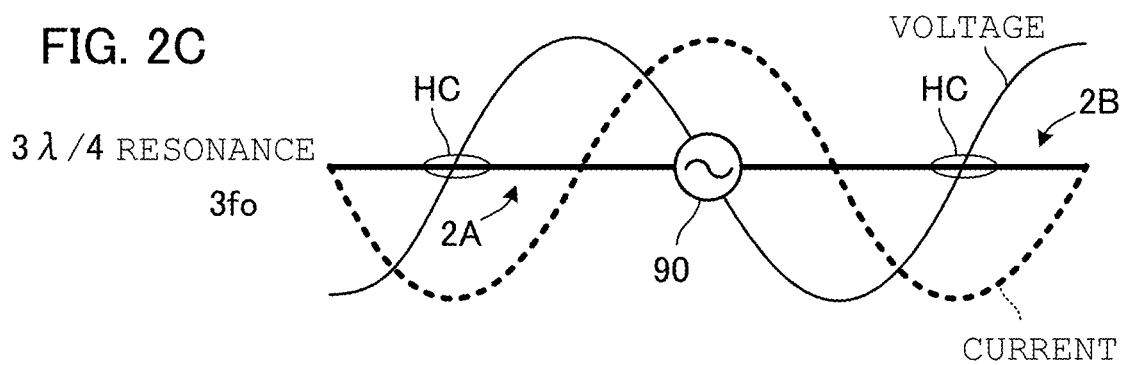
Figure 2D:
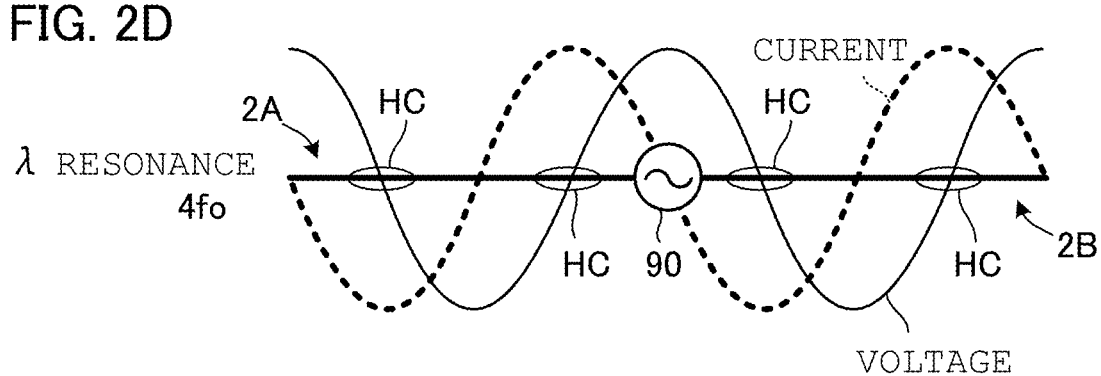

Under the condition that high-order resonance modes as shown in FIG. 2B, FIG. 2C, and FIG. 2D occur at the frequency of the microwave for electromagnetic wave heating, a high current density region HC having a high current density is generated on the antenna patterns 2A and 2B. When the LC resonance circuit 20 is disposed adjacent to the high current density region HC, that is, when the adjacent position PP is set to the high current density region HC, the degree of coupling between the LC resonance circuit 20 and the antenna patterns 2A and 2B increases, and the harmonic resonance does not occur at the antenna patterns 2A and 2B at the frequency of the microwave for electromagnetic wave heating.

Second Exemplary Embodiment

In the second embodiment, an RFID tag having a meander line-shaped antenna pattern is shown.

First, regarding fundamental resonance and harmonic resonance, the difference between an RFID tag having a meander line-shaped antenna pattern and an RFID tag having a linear antenna pattern as shown in the first embodiment will be described.

Figure 11:
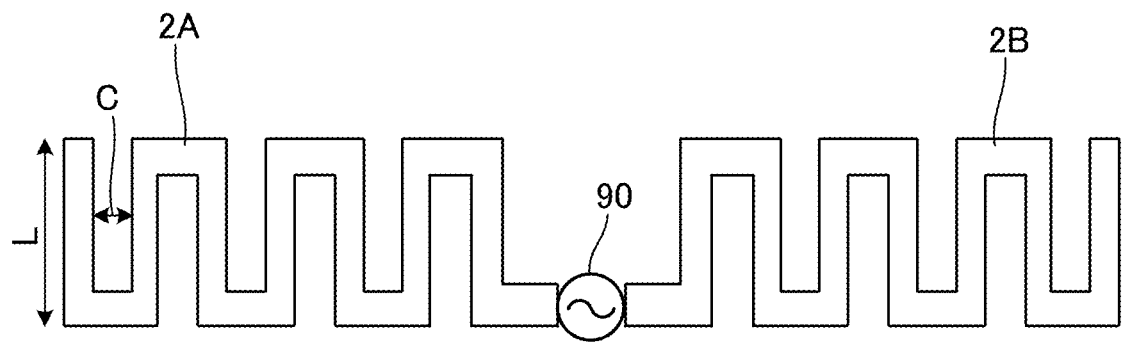
FIG. 11 is a plan view showing an example of an antenna pattern of a conventional RFID tag including antenna patterns 2A and 2B having a meander line shape.

FIG. 11 is a plan view showing an example of an antenna pattern of a conventional RFID tag having the antenna patterns 2A and 2B in a meander line shape. FIG. 11 shows an inductance component L of the conductor pattern and a capacitance component C between adjacent conductor patterns. As a method of miniaturizing the antenna, it is common to make the antenna pattern into a meander line shape, but between the fundamental wave resonance and harmonic resonance of the antenna patterns 2A and 2B, the effects of making the antenna pattern into a meander line shape are different. That is, when the antenna pattern has a meander line shape, the inductance component L and the capacitance component C increase due to the adjacency between the conductor patterns, and the resonance frequency shifts to a low frequency range. However, in the fundamental wave resonance, the maximum point of the current or voltage occurs only at one place, but in the harmonic resonance, the maximum point of the current or voltage occurs at a plurality of places. Therefore, the harmonic resonance is greatly affected by the inductance component L and the capacitance component C as compared with the fundamental wave resonance. Therefore, the harmonic resonance has a larger low-frequency shift amount of the resonance frequency due to the above-mentioned meander line shape as compared with the fundamental wave resonance. For example, the condition tends to become such that at the antenna patterns 2A and 2B, fundamental wave resonance occurs at the frequency of the communication signal in the UHF band from 860 MHz to 960 MHz, and harmonic resonance (second harmonic resonance) occurs at a frequency 2.45 GHz for electromagnetic wave heating.

Figure 3A:
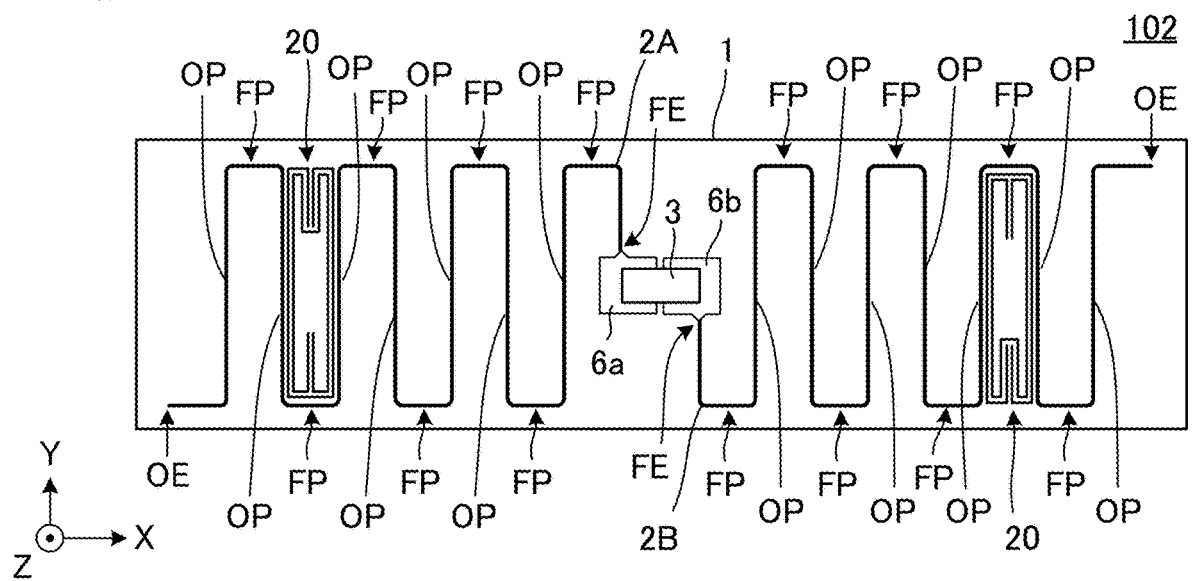
FIG. 3A is a plan view of an RFID tag 102 according to the second exemplary embodiment.
Figure 3B:
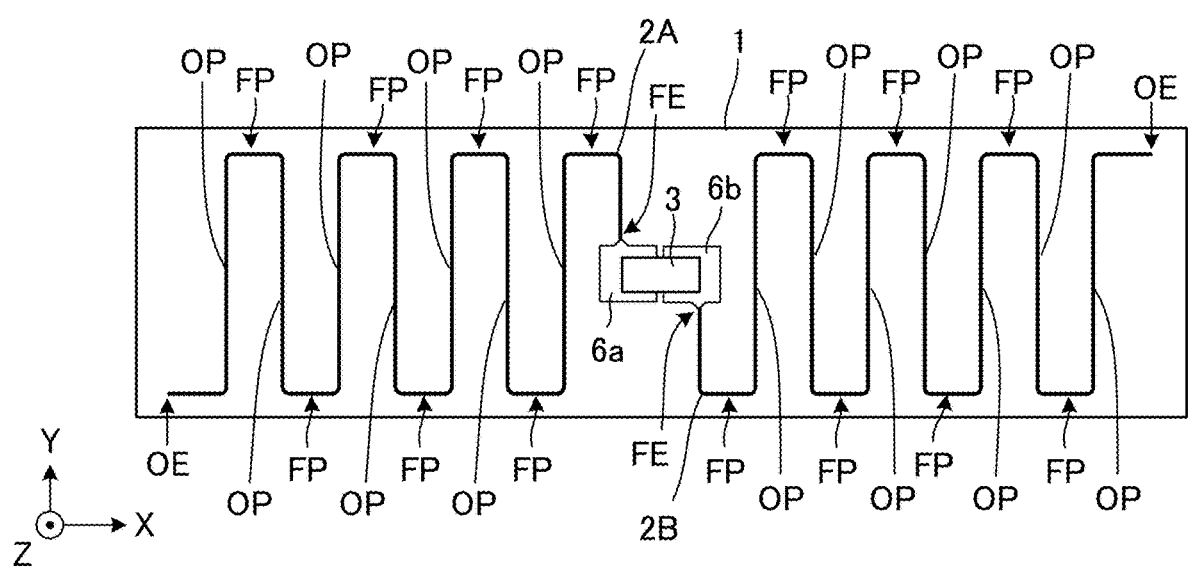
FIG. 3B is a plan view of an RFID tag as a comparative example.

FIG. 3A is a plan view of the RFID tag 102 according to the second embodiment, and FIG. 3B is a plan view of the RFID tag as a comparative example.

As shown in FIG. 3A, the RFID tag 102 includes an insulating base material 1, antenna patterns 2A and 2B formed on the base material 1, and an RFIC package 3 connected to the antenna patterns 2A and 2B. The antenna patterns 2A and 2B are meander line-shaped, and are configured such that the first antenna pattern 2A in a meander line shape that has a plurality of folded-back portions FP and meanders from the first land pattern 6a on which the RFIC package 3 is mounted, and the second antenna pattern 2B in a meander line shape that has a plurality of folded-back portions and meanders from the second land pattern 6b on which the RFIC package 3 is mounted are extended respectively. That is, the meander line-shaped first antenna pattern 2A is extended from the first land pattern 6a toward one end (i.e., a first end) in the longitudinal direction of the base material 1 (in the −X direction). Further, the meander line-shaped second antenna pattern 2B is extended from the second land pattern 6b toward the other end (i.e., a second end) in the longitudinal direction of the base material 1 (in the +X direction).

With the above configuration, the antenna patterns 2A and 2B act as a dipole type electric field antenna.

The folded-back portion FP of the antenna patterns 2A and 2B is a portion where the extending direction of the antenna patterns 2A and 2B is reversed. The antenna patterns 2A and 2B include the conductor patterns OP facing each other by being folded back at the folded-back portion FP.

According to the exemplary aspect, the antenna patterns 2A and 2B are a metal material with high conductivity such as an aluminum electrode and a copper electrode. As the antenna patterns 2A and 2B, a carbon-based material other than metal material may be used.

In the antenna patterns 2A and 2B, a conductor pattern gap portion is formed between the respective conductor patterns OP, which are adjacent to each other, and the LC resonance circuit 20 is disposed in one of these plurality of conductor pattern gap portions. The RFID tag as a comparative example shown in FIG. 3B has no LC resonance circuit 20.

Figure 4A:
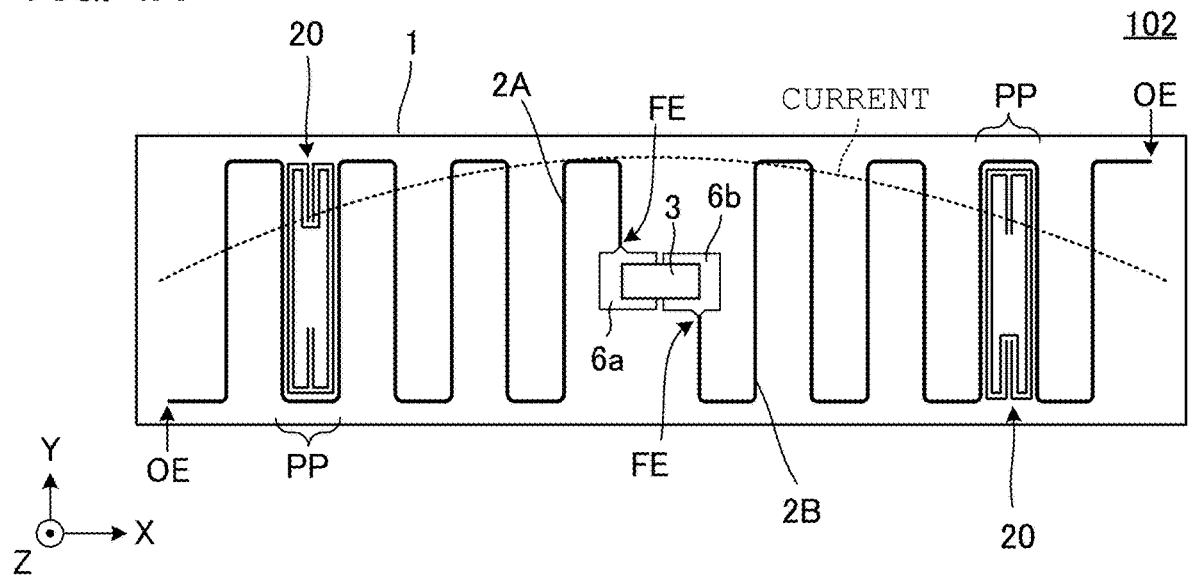
FIGS. 4A and 4B are diagrams showing intensity distributions of currents flowing through the antenna patterns 2A and 2B superimposed on a plan view of the RFID tag 102 according to the second exemplary embodiment.
Figure 4B:
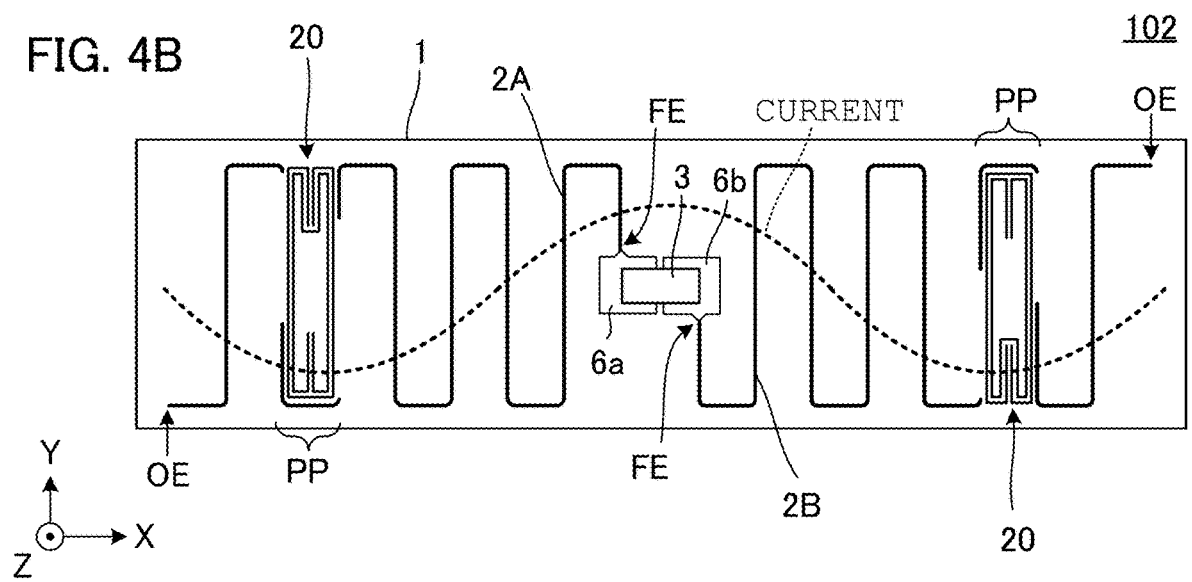

FIGS. 4A and 4B are views showing intensity distributions of currents flowing through the antenna patterns 2A and 2B superimposed on the plan view of the RFID tag 102 according to the second embodiment.

The waveform of the current distribution shown in FIG. 4A shows the current distribution in fundamental wave resonance in which a standing wave having a ¼ wavelength is generated in each of the first antenna pattern 2A and the second antenna pattern 2B. The fundamental wave resonance occurs in this way at the frequency of the communication signal of the RFID tag 102. As described above, the antenna patterns 2A and 2B of the RFID tag 102 of the present embodiment act as a dipole type electric field antenna during communication as the RFID tag.

During such communication as an RFID tag, the LC resonance circuit 20 does not resonate, to have almost no effect on the antenna patterns 2A and 2B.

The waveform of the current distribution shown in FIG. 4B shows the current distribution in harmonic resonance in which a standing wave having a ¾ wavelength is generated in each of the first antenna pattern 2A and the second antenna pattern 2B. Harmonic resonance occurs at the RFID tag 102 in this way at a frequency of a microwave for electromagnetic wave heating.

As shown in FIG. 4B, since the LC resonance circuit 20 is adjacent to the antenna patterns 2A and 2B, the harmonic resonance does not occur at the antenna patterns 2A and 2B at the frequency of the microwave for electromagnetic wave heating, and the current is less likely to be induced. That is, the antenna patterns 2A and 2B are less likely to receive the energy of the microwave for electromagnetic wave heating. Further, the LC resonance circuit 20 resonates at the frequency of the microwave for electromagnetic wave heating, so that the LC resonance circuit 20 itself and the antenna patterns 2A and 2B or the base material 1 adjacent thereto are heated. The antenna patterns 2A and 2B or the base material 1 are cut by melting or by sublimation at the above-mentioned adjacent position PP by the heating. FIG. 4B shows a state after the antenna patterns 2A and 2B are separated at the adjacent position PP in this way.

In the present embodiment, as shown in FIG. 4B, the adjacent position PP is also a harmonic current concentration portion where the current density increases at the frequency of the harmonic resonance. The current density of this adjacent position PP is higher than that of other positions. Therefore, the degree of coupling between the LC resonance circuit 20 and the antenna patterns 2A and 2B increases, and the harmonic resonance does not occur at the antenna patterns 2A and 2B at the frequency of the microwave for electromagnetic wave heating.

Figure 5:
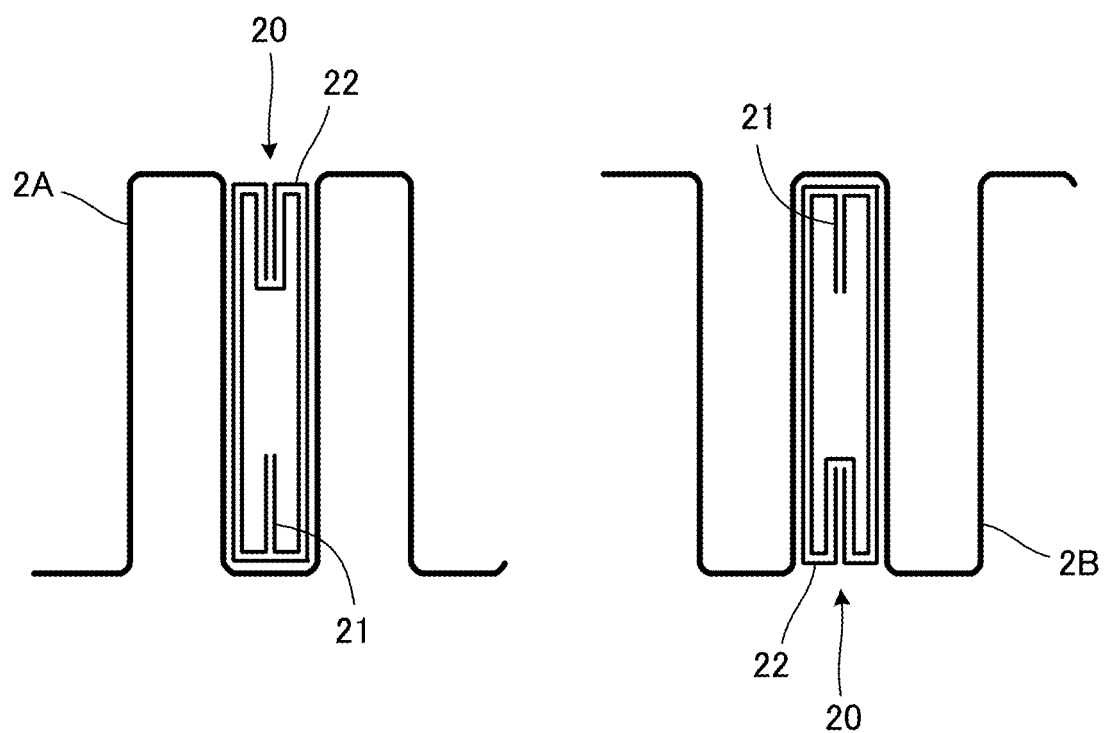
FIG. 5 is a diagram showing a structure of an LC resonance circuit 20.

FIG. 5 is a diagram showing a structure of the LC resonance circuit 20. The LC resonance circuit 20 is composed of two loop-shaped conductor patterns 21 and 22, each having an open end. The open end of the loop-shaped conductor pattern 21 and the open end of the loop-shaped conductor pattern 22 are arranged on opposite sides of each other. That is, it is a duplicated split ring resonator.

Figure 6:
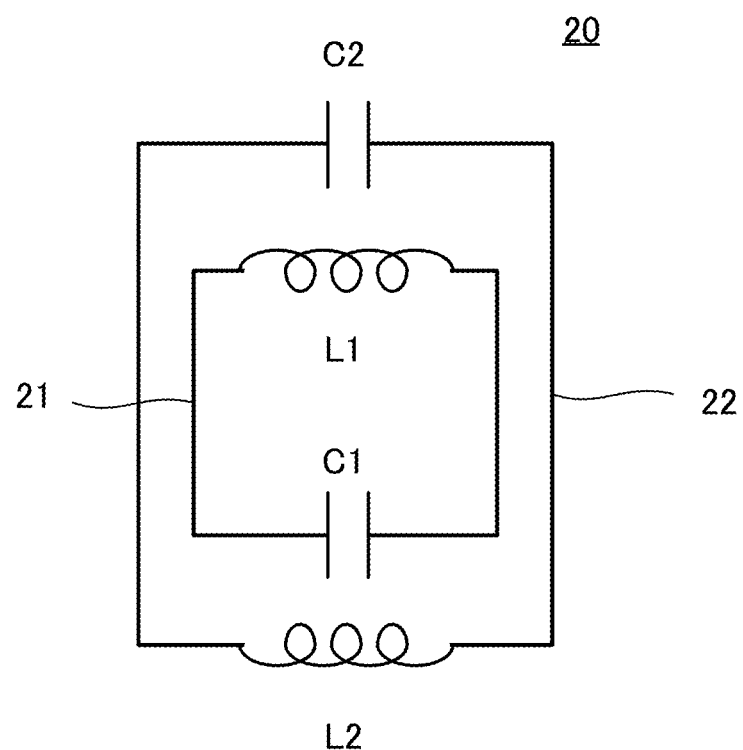
FIG. 6 is an equivalent circuit diagram of the LC resonance circuit 20.

FIG. 6 is an equivalent circuit diagram of the LC resonance circuit 20. As described above, the LC resonance circuit 20 has a structure in which a resonance circuit by an inductor L1 and a capacitor C1 and a resonance circuit by an inductor L2 and a capacitor C2 are coupled to each other.

In the RFID tag 102 of the present embodiment, a region of the antenna patterns 2A and 2B which the LC resonance circuit 20 is adjacent to is long, so that the antenna patterns 2A and 2B and the LC resonance circuit 20 can be coupled more efficiently.

Figure 7:
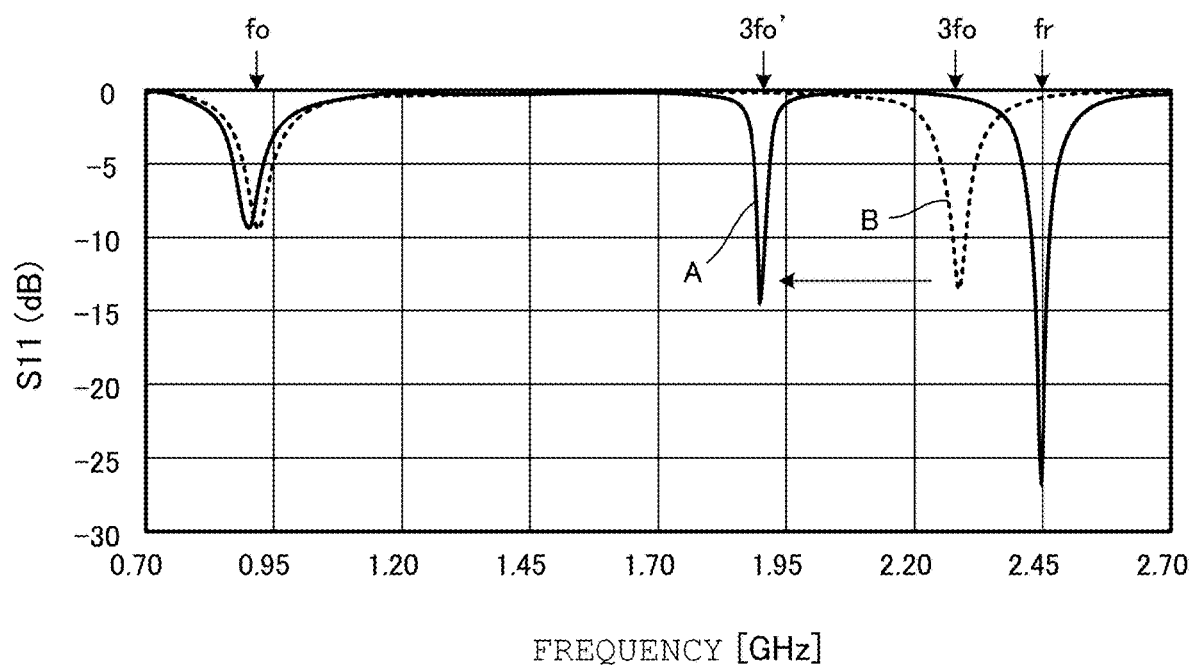
FIG. 7 is a diagram showing frequency characteristics of a reflection coefficient S11 when the antenna patterns 2A and 2B are viewed from land patterns 6a and 6b on which an RFIC package 3 is mounted in the RFID tag 102 or the RFID tag as a comparative example.

FIG. 7 is a diagram showing the frequency characteristics of the reflection coefficient S11 when the antenna patterns 2A and 2B are viewed from the land patterns 6a and 6b on which the RFIC package 3 is mounted in the RFID tag 102 or the RFID tag as a comparative example. In FIG. 7, a curve A shows the characteristics of the RFID tag 102, and a curve B shows the characteristics of the RFID tag as a comparative example shown in FIG. 3. In FIG. 7, a frequency fo is the fundamental resonance frequency of the antenna patterns 2A and 2B, and is the frequency of the communication signal. Further, a frequency fr is the resonance frequency of the LC resonance circuit 20, and is the frequency of the microwave for electromagnetic wave heating.

Frequencies 3 fo and 3 fo' are harmonic resonance frequencies by the ¾ wavelength resonance. The harmonic resonance frequency 3 fo when the LC resonance circuit 20 does not exist is reduced to 3 fo' by adding the LC resonance circuit 20. Therefore, since the harmonic resonance frequency decreases in the direction away from the frequency fr of the microwave for electromagnetic wave heating, the harmonic resonance does not occur at the antenna patterns 2A and 2B at the frequency fr of the microwave for electromagnetic wave heating.

Figure 8:
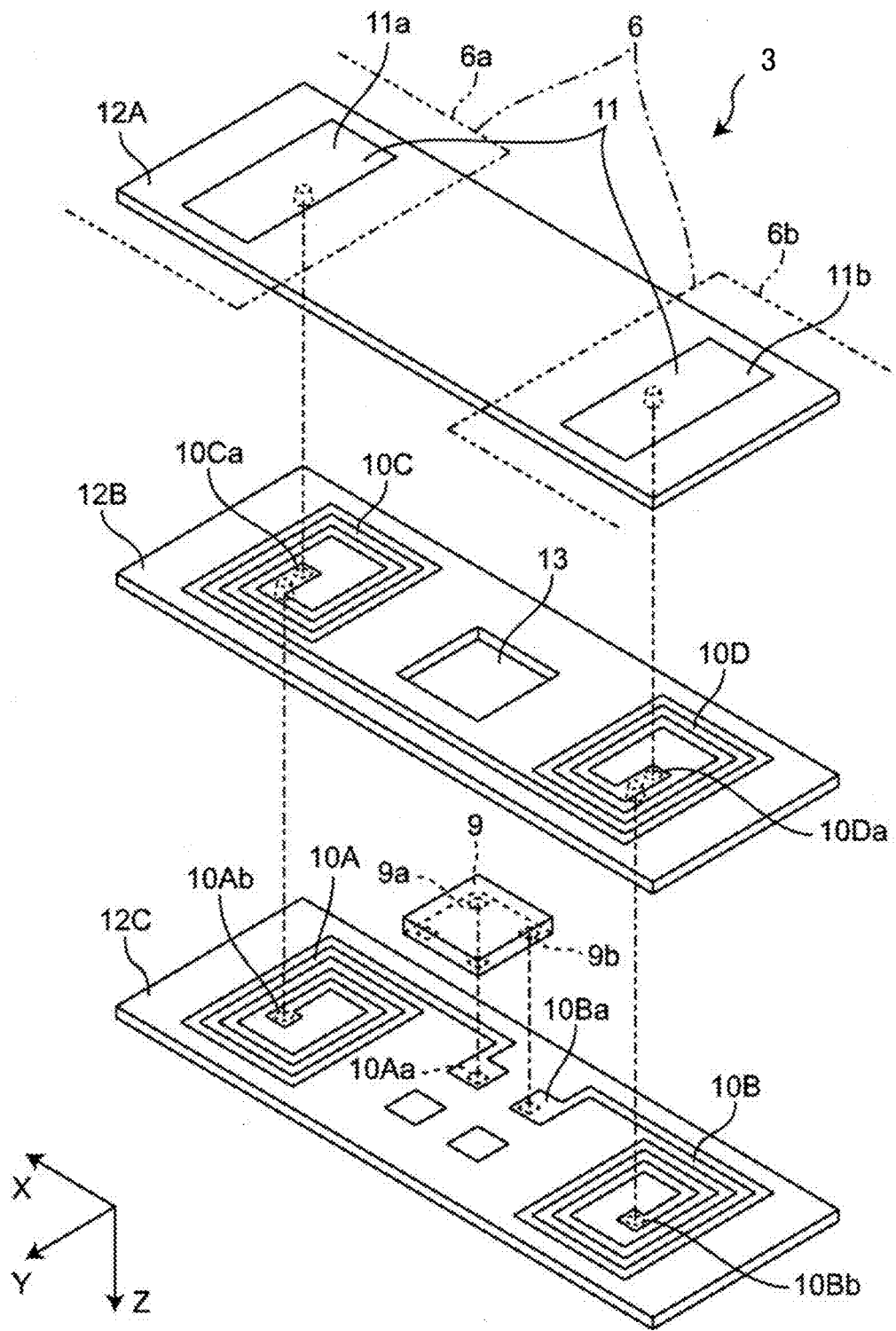
FIG. 8 is an exploded perspective view showing a configuration of the RFIC package 3 mounted on the land patterns 6 (6a, 6b) of the antenna patterns 2A and 2B.

FIG. 8 is an exploded perspective view showing a configuration of the RFIC package 3 mounted on the land patterns 6 (6a, 6b) of the antenna patterns 2A and 2B. As shown in FIG. 8, the RFIC package 3 in the first embodiment is composed of a multilayer substrate including three layers. Specifically, in an exemplary aspect, the multilayer substrate of RFIC Package 3 can be made of a resin material such as polyimide or liquid crystal polymer, and includes three flexible insulating sheets 12A, 12B, and 12C which are laminated. Each of the insulating sheets 12A, 12B, and 12C has a substantially quadrilateral shape in a plan view, and has a substantially rectangular shape in the present embodiment. The RFIC package 3 shown in FIG. 8 shows a state in which the RFIC package 3 shown in FIG. 3A is turned upside down and the three layers are disassembled.

As shown in FIG. 8, the RFIC package 3 has an RFIC chip 9, a plurality of inductance elements 10A, 10B, 10C, 10D, and external connection terminals 11 (11a, 11b) connected to the antenna patterns 2A and 2B, which are formed at desired positions on a three-layer substrate (insulating sheets 12A, 12B, 12C).

The external connection terminals 11a and 11b are formed on the first insulating sheet 12A which is the lowermost layer (i.e., the substrate facing the antenna patterns 2A and 2B), and are formed at positions facing the land patterns 6a and 6b of the antenna patterns 2A and 2B. The four inductance elements 10A, 10B, 10C, and 10D are separated into groups of two and formed on the second insulating sheet 12B and the third insulating sheet 12C. That is, the first inductance element 10A and the second inductance element 10B are formed on the third insulating sheet 12C, which is the uppermost layer (i.e., the layer shown at the bottom in FIG. 8), and the third inductance element 10C and the fourth inductance element 10D are formed on the second insulating sheet 12B, which is an intermediate layer.

In the RFIC package 3 of the present embodiment, each of the external connection terminals 11a, 11b and the four inductance elements 10A, 10B, 10C, 10D is composed of a conductor pattern made of a conductive material such as an aluminum foil or a copper foil.

As shown in FIG. 8, the RFIC chip 9 is mounted on the third insulating sheet 12C, which is the uppermost layer, in the central portion in the longitudinal direction (i.e., X direction in FIG. 8). The RFIC chip 9 has a structure in which an RF circuit is formed on a semiconductor substrate made of a semiconductor such as silicon. The first inductance element 10A formed in a spiral shape on one side in the longitudinal direction (i.e., the side in the +X direction in FIG. 8) on the third insulating sheet 12C is connected to one input/output terminal 9a of the RFIC chip 9 via a land 10Aa. The second inductance element 10B formed in a spiral shape on the other side in the longitudinal direction (i.e., the side in the −X direction in FIG. 8) on the third insulating sheet 12C is connected to the other input/output terminal 9b of the RFIC chip 9 via a land 10Ba.

The third inductance element 10C in a spiral shape is formed on one side in the longitudinal direction (i.e., the side in the +X direction in FIG. 8) on the second insulating sheet 12B, which is an intermediate layer, and the fourth inductance element 10D in a spiral shape is formed on the other side in the longitudinal direction (i.e., the side in the −X direction in FIG. 8) on the second insulating sheet 12B. The outer peripheral end of the third inductance element 10C in the spiral shape and the outer peripheral end of the fourth inductance element 10D in the spiral shape are directly connected. On the other hand, a land 10Ca, which is the inner peripheral end of the third inductance element 10C, is connected to a land 10Ab, which is the inner peripheral end of the first inductance element 10A in a spiral shape on the third insulating sheet 12C, via an interlayer connecting conductor such as a via conductor penetrating the second insulating sheet 12B. Further, the land 10Ca, which is the inner peripheral end of the third inductance element 10C, is connected to a first external connection terminal 11a on the first insulating sheet 12A via an interlayer connecting conductor such as a through-hole conductor penetrating the first insulating sheet 12A which is the lowermost layer.

Moreover, a land 10Da, which is the inner peripheral end of the fourth inductance element 10D, is connected to a land 10Bb, which is the inner peripheral end of the second inductance element 10B in a spiral shape on the third insulating sheet 12C, via an interlayer connecting conductor such as a through-hole conductor penetrating the second insulating sheet 12B. Further, the land 10Da, which is the inner peripheral end of the fourth inductance element 10D, is connected to a second external connection terminal 11b on the first insulating sheet 12A via an interlayer connecting conductor such as a through-hole conductor penetrating the first insulating sheet 12A which is the lowermost layer.

The first external connection terminal 11a on the first insulating sheet 12A is arranged so as to be connected to the first land pattern 6a of the first antenna pattern 2A formed on the base material 1. Further, the second external connection terminal 11b on the first insulating sheet 12A is arranged so as to be connected to the second land pattern 6b of the second antenna pattern 2B formed on the base material 1.

Further, the second insulating sheet 12B, which is an intermediate layer, is formed with a through hole 13 in which the RFIC chip 9 mounted on the third insulating sheet 12C is housed. The RFIC chip 9 is arranged between the first inductance element 10A and the second inductance element 10B, and between the third inductance element 10C and the fourth inductance element 10D. Therefore, the RFIC chip 9 functions as a shield, and magnetic field coupling and electric field coupling between the first inductance element 10A and the second inductance element 10B are suppressed. Similarly, magnetic field coupling and electric field coupling between the third inductance element 10C and the fourth inductance element 10D are suppressed. As a result, in the RFIC Package 3, the narrowing of a pass band of the communication signal is suppressed, and the pass band is widened.

In the present embodiment, the RFIC package 3 is mounted on the antenna patterns 2A and 2B, but the RFIC chip 9 may be mounted directly on the antenna patterns 2A and 2B. Further, at this time, the inductors configured as the plurality of inductance elements 10A, 10B, 10C, 10D in the RFIC package 3 may be configured on the base material 1 by a loop-shaped pattern.

Figure 9:
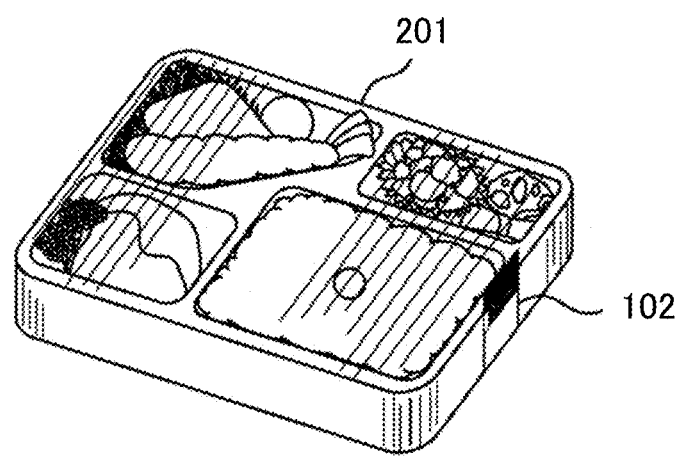
FIG. 9 is a diagram showing an example of a product with an RFID tag, and is a perspective view of a lunch box 201 with the RFID tag 102.

FIG. 9 is a diagram showing an example of a product with an RFID tag, and is a perspective view of a lunch box 201 with the RFID tag 102.

In this way, even when the lunch box 201 with the RFID tag 102 is heated in a microwave oven, the ignition of the RFID tag 102 and further the melting and deforming of a wrapping film of the lunch box with the RFID tag 102 can be prevented according to the technical advantages provided by the exemplary embodiments described above.

Third Exemplary Embodiment

In the third embodiment, an RFID tag in which the arrangement position of the LC resonance circuit is different from that in the example shown in the second embodiment is shown.

Figure 10A:
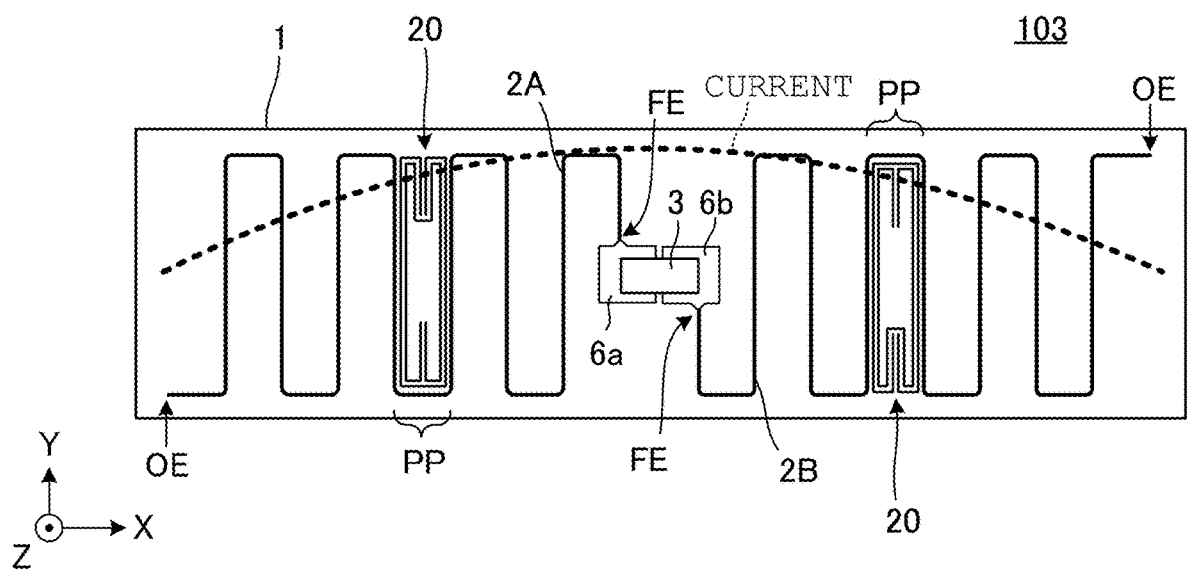
FIGS. 10A and 10B are plan views of an RFID tag 103 according to a third exemplary embodiment.
Figure 10B:
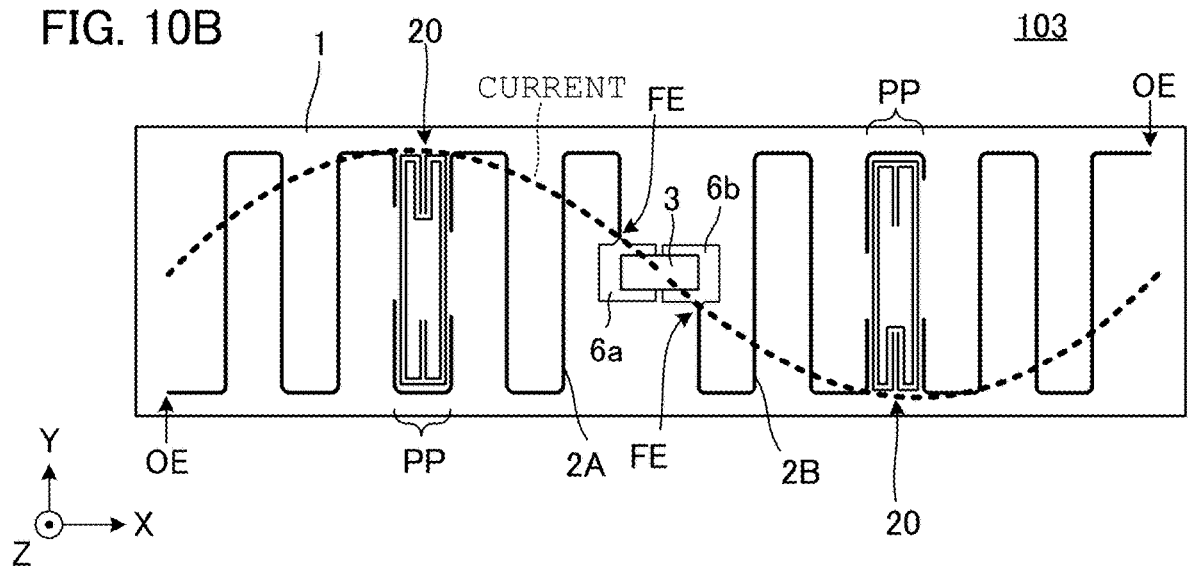

FIGS. 10A and 10B are plan views of an RFID tag 103 according to the third embodiment. The RFID tag 103 includes an insulating base material 1, antenna patterns 2A and 2B formed on the base material 1, and an RFIC package 3 connected to the antenna patterns 2A and 2B. The arrangement position of the LC resonance circuit 20 is different from that of the RFID tag 102 shown in FIGS. 4A and 4B. In addition, the modes of harmonic resonance are different according to this exemplary embodiment.

The waveform of the current distribution shown in FIG. 10A shows the current distribution in fundamental wave resonance in which a standing wave having a ¼ wavelength is generated in each of the first antenna pattern 2A and the second antenna pattern 2B. The fundamental wave resonance occurs in this way at the frequency of the communication signal of the RFID tag 103.

The waveform of the current distribution shown in FIG. 10B shows the current distribution in harmonic resonance in which a standing wave having a ½ wavelength is generated in each of the first antenna pattern 2A and the second antenna pattern 2B. As such, the harmonic resonance occurs in this way at the RFID tag 103 at a frequency of a microwave for electromagnetic wave heating.

In the RFID tag 103, the LC resonance circuit 20 is disposed at a position where the current density is high in the harmonic resonance mode of the ½ wavelength resonance, as shown in FIG. 10B.

As shown in FIG. 10B, since the LC resonance circuit 20 is adjacent to the antenna patterns 2A and 2B, the harmonic resonance does not occur at the antenna patterns 2A and 2B at a frequency of a microwave for electromagnetic wave heating, and the current is less likely to be induced. That is, the antenna patterns 2A and 2B are less likely to receive the energy of the microwave for electromagnetic wave heating. Further, when the LC resonance circuit 20 resonates at the frequency of the microwave for electromagnetic wave heating, the LC resonance circuit 20 itself and the antenna patterns 2A and 2B or the base material 1 adjacent thereto are heated. The antenna patterns 2A and 2B or the base material 1 are cut by melting or by sublimation at the above-mentioned adjacent position PP by the heating. FIG. 10B shows a state after the antenna patterns 2A and 2B are separated at the adjacent position in this way.

Also in this embodiment, as shown in FIG. 10B, the adjacent position PP is a harmonic current concentration portion where the current density increases at the frequency of the harmonic resonance. Therefore, the separation performance at the adjacent position PP of the antenna patterns 2A and 2B by irradiation with the microwave for electromagnetic wave heating is high.

As described above, as shown in some examples, the antenna patterns 2A and 2B are separated at the intermediate position, so that the harmonic resonance does not occur at the antenna patterns 2A and 2B at the frequency of the microwave for electromagnetic wave heating. Moreover, it is noted that the LC resonance circuit 20 may be disposed at the above separation position. Further, in particular, it is preferable that the LC resonance circuit 20 is disposed at a place where the resonance occurs by reception of the microwave for electromagnetic wave heating, so that the harmonic current is concentrated.

In an exemplary aspect, the LC resonance circuit 20 can be provided only on one of the first antenna pattern 2A and the second antenna pattern 2B. Even in that case, if the antenna patterns 2A and 2B are separated at the adjacent position of the LC resonance circuit 20, the effective length of the antenna patterns 2A and 2B becomes short, the harmonic resonance is not maintained, and heat generation by the harmonic current is stopped.

Further, the LC resonance circuit 20 is not limited to one in which fundamental wave resonance occurs at the frequency of a microwave for electromagnetic wave heating, and may have a configuration in which harmonic resonance occurs.

Further, in FIGS. 3A and 3B and FIGS. 10a and 10B and the like, an example is shown in which the shapes of the first antenna pattern 2A and the second antenna pattern 2B included in the RFID tag are point-symmetrical with respect to the feeding point (i.e., position of the RFIC package 3). However, the relationship between the shapes of the two antenna patterns 2A and 2B may be line-symmetrical with the feeding point as the center. Furthermore, it may be asymmetric in an alternative aspect.

As described above using specific configurations in each embodiment, according to these embodiments, when the product with the RFID tag is heated by the electromagnetic wave heating device, ignition of the RFID tag and even melting and deformation of members in products can be prevented to which RFID tags are attached. Therefore, the present invention provides wireless communication devices that make it possible to construct a system for automating the accounting and bagging of purchased products at stores such as convenience stores that handle a wide variety of products such as foods and daily necessities, and can make great strides toward the practical application of "unmanned" convenience stores.

The description of the above-described embodiments is an example in all respects and is not restrictive. Modifications and changes can be made as appropriate by those skilled in the art.

The exemplary embodiments of the present invention provide a product highly versatile and useful as a wireless communication device attached to a product, and particularly necessary for realization of an "unmanned" convenience store.

REFERENCE SIGNS LIST

FE feeder circuit connection end
FP folded part
HC high current density region
OE open end
OP conductor patterns facing each other
PP adjacent position
1 base material
2A first antenna pattern
2B second antenna pattern
3 RFIC package
6 land pattern
6a first land pattern
6b second land pattern
9 RFIC chip
9a, 9b input/output terminal
10A first inductance element
10B second inductance element
10C third inductance element
10D fourth inductance element
10Aa, 10Ab, 10Ba, 10Bb, 10Ca, 10Da land
11 external connection terminal
11a first external connection terminal
11b second external connection terminal
12A first insulating sheet
12B second insulating sheet
12C third insulating sheet
13 through hole
20 LC resonance circuit
21, 22 loop-shaped conductor pattern
90 feeder circuit
101, 102, 103 RFID tag
201 lunch box

The invention claimed is:

1. A wireless communication device for transmitting and receiving a communication signal, the wireless communication device comprising:
a base material;
an antenna pattern disposed on the base material;
a feeder circuit connected to the antenna pattern; and
an LC resonance circuit disposed adjacent to the antenna pattern and configured to resonate at a frequency higher than a frequency of the communication signal.

2. The wireless communication device according to claim 1, wherein the antenna pattern defines a dipole-type electric field antenna having a feeding end that is connected to the feeder circuit and a tip that is an open end opposite the feeding end.

3. The wireless communication device according to claim 2, wherein the LC resonance circuit is disposed adjacent to an intermediate portion between the feeding end and the open end.

4. The wireless communication device according to claim 3, wherein a harmonic resonance occurs at the antenna pattern at a frequency higher than a resonance frequency at the frequency of the communication signal.

5. The wireless communication device according to claim 4, wherein the LC resonance circuit is disposed adjacent to a portion of the antenna pattern where a harmonic current is concentrated due to the harmonic resonance.

6. The wireless communication device according to claim 5, wherein a resonance at the frequency of the communication signal is ¼ wavelength resonance, and the harmonic resonance is one of a ½ wavelength resonance and a ¾ wavelength resonance.

7. The wireless communication device according to claim 5, wherein the antenna pattern comprises a meander line shape, and the LC resonance circuit is disposed between a pair of conductor patterns of the meander line shape that face each other.

8. The wireless communication device according to claim 5, wherein the frequency of the communication signal is a frequency in a UHF band, and the frequency of the harmonic resonance is a frequency between 2.4 GHz and 2.5 GHz.

9. The wireless communication device according to claim 1, wherein the feed circuit comprises an RFIC element.

10. The wireless communication device according to claim 1, wherein the LC resonance circuit is configured to heat and cut the respective portion of the antenna pattern adjacent to the LC resonance circuit by resonating at the frequency higher than the frequency of the communication signal.

11. A wireless communication device for transmitting and receiving a communication signal, the wireless communication device comprising:
a base material;
an antenna pattern disposed on the base material;
a feeder circuit connected to the antenna pattern; and
an LC resonance circuit constructed to heat and cut the antenna pattern by resonating at a frequency higher than a frequency of the communication signal.

12. The wireless communication device according to claim 11, wherein the antenna pattern comprises a dipole-type electric field antenna having a feeding end that is connected to the feeder circuit and an open end opposite the feeding end.

13. The wireless communication device according to claim 12, wherein the LC resonance circuit is disposed adjacent to a portion between the feeding end and the open end.

14. The wireless communication device according to claim 13, wherein a harmonic resonance occurs at the antenna pattern at a frequency higher than a resonance frequency of the communication signal.

15. The wireless communication device according to claim 14, wherein the LC resonance circuit is disposed adjacent to a portion of the antenna pattern where a harmonic current is concentrated due to the harmonic resonance.

16. The wireless communication device according to claim 15, wherein a resonance at the frequency of the communication signal is ¼ wavelength resonance, and the harmonic resonance is one of a ½ wavelength resonance and a ¾ wavelength resonance.

17. The wireless communication device according to claim 15, wherein the antenna pattern comprises a meander line shape, and the LC resonance circuit is disposed between a pair of conductor patterns of the meander line shape that face each other.

18. The wireless communication device according to claim 15, wherein the frequency of the communication signal is a frequency in a UHF band, and the frequency of the harmonic resonance is a frequency between 2.4 GHz and 2.5 GHz.

19. The wireless communication device according to claim 11, wherein the feed circuit comprises an RFIC element.

20. A wireless communication device for transmitting and receiving a communication signal, the wireless communication device comprising:
a base material;
a feeder circuit;
a dipole-type electric field antenna having a pair of feeding ends connected to the feeder circuit and a pair of open ends opposite the pair of feeding ends, respectively; and
at least one LC resonance circuit disposed on the base material and between one of the pair of feeding ends and one of the pair of open ends, respectively;
wherein the at least one LC resonance circuit is constructed to heat and cut a portion of the antenna by resonating at a frequency higher than a frequency of the communication signal.

* * * * *